United States Patent
Dailey et al.

(10) Patent No.: US 9,979,484 B2
(45) Date of Patent: May 22, 2018

(54) PHOTONICS-BASED CHANNELIZATION ENABLED BY PHASE-SENSITIVE AMPLIFICATION

(71) Applicant: Vencore Labs, Inc., Basking Ridge, NJ (US)

(72) Inventors: James M. Dailey, Basking Ridge, NJ (US); Anjali Agarwal, Basking Ridge, NJ (US); Paul Toliver, Basking Ridge, NJ (US); Tom Banwell, Basking Ridge, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days. days.

(21) Appl. No.: 15/421,706

(22) Filed: Feb. 1, 2017

(65) Prior Publication Data

US 2017/0222721 A1    Aug. 3, 2017

Related U.S. Application Data

(60) Provisional application No. 62/289,685, filed on Feb. 1, 2016.

(51) Int. Cl.
*H04B 10/11* (2013.01)
*H04B 10/2575* (2013.01)

(52) U.S. Cl.
CPC ....... *H04B 10/25752* (2013.01); *H04B 10/11* (2013.01)

(58) Field of Classification Search
CPC .......... H04B 10/25752; H04B 10/11
See application file for complete search history.

(56) References Cited

U.S. PATENT DOCUMENTS

2011/0129230 A1* 6/2011 Zanoni ............... H04B 10/5055
  398/140
2013/0071113 A1* 3/2013 McKinstrie ............ H04B 10/25
  398/39

(Continued)

OTHER PUBLICATIONS

Wangzhe Li, "First Monolithically Integrated Dual-Pumped Phase-Sensitive Amplifier Chip Based on a Saturated Semiconductor Optical Amplifier", IEEE Journal of Quantum Electronics, vol. 52, No. 1, Jan. 2016, pp. 1-10.*

(Continued)

*Primary Examiner* — David Payne
*Assistant Examiner* — Omar S Ismail
(74) *Attorney, Agent, or Firm* — Heslin Rothenberg Farley & Mesiti P.C.

(57) ABSTRACT

A system and method for channelization of a wideband radio frequency signal into multiple narrowband channels includes obtaining, a dual-banded optical signal, where the dual-banded signal is a translated wideband radio frequency signal, and where the dual-banded signal includes a signal and an idler. The method also includes modifying, by the spectral phase mask, the spectral phases of at least one of the signal or the idler, where the modifying produces a spectral phase modulated output comprising at least one of a spectrally-modulated signal or a spectrally modulated idler. The method includes outputting, by the spectral phase mask, the spectral phase modulated output to an optical phase sensitive amplifier. The method includes receiving, by the optical phase sensitive amplifier, the spectral phase modulated output, and either amplifying or de-amplifying, by the optical phase sensitive amplifier, each component of the spectrally modulated output.

18 Claims, 9 Drawing Sheets

(56) References Cited

U.S. PATENT DOCUMENTS

2013/0208334 A1* 8/2013 Kakande .............. H04B 10/291
　　　　　　　　　　　　　　　　　　　　　　359/246
2015/0036210 A1* 2/2015 Asobe ....................... G02F 1/39
　　　　　　　　　　　　　　　　　　　　　　359/341.3

OTHER PUBLICATIONS

Takeshi Umeki, "Phase sensitive degenerate parametric amplification using directly-bonded PPLN ridge waveguides"—Optics Express—vol. 19, No. 7, Mar. 2011 , pp. 1-6.*

* cited by examiner

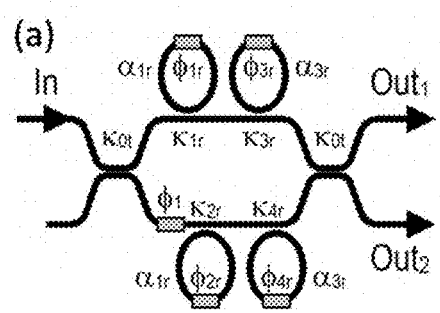
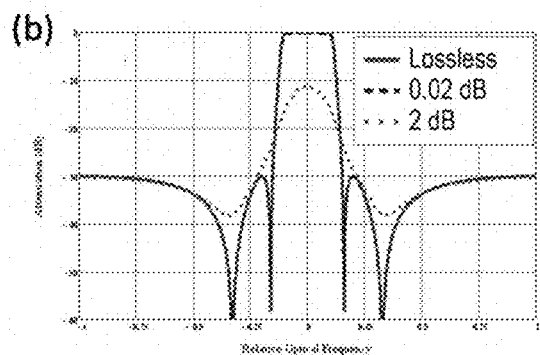
FIG. 3A
FIG. 3B
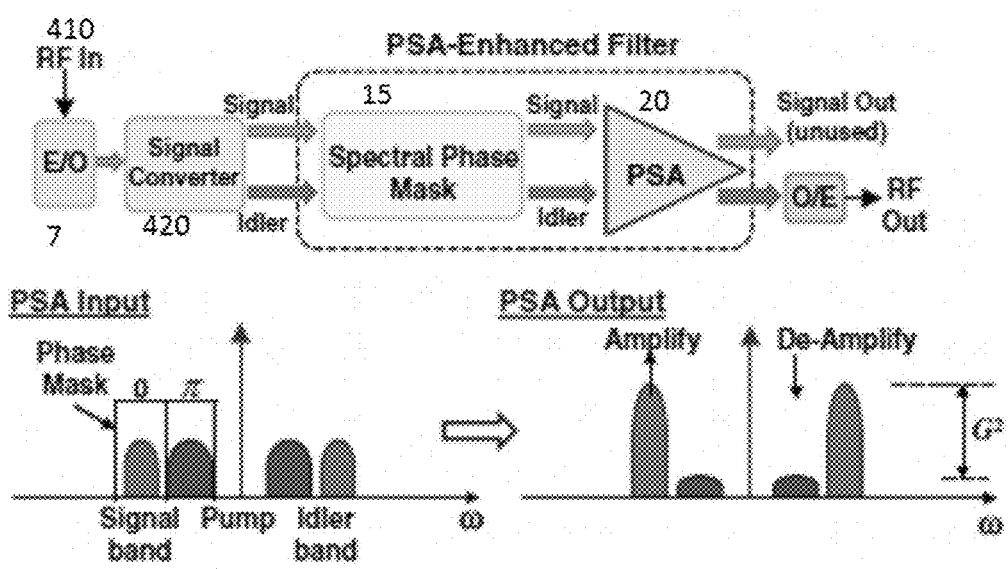
FIG. 4

PHOTONICS-BASED CHANNELIZATION ENABLED BY PHASE-SENSITIVE AMPLIFICATION

CROSS-REFERENCE TO RELATED APPLICATIONS

This application claims priority to U.S. Provisional Application No. 62/289,685 filed Feb. 1, 2016, entitled, "PHOTONICS-BASED CHANNELIZATION ENABLED BY PHASE-SENSITIVE AMPLIFICATION" which is incorporated herein by reference in its entirety.

FIELD OF INVENTION

The present invention relates to signal processing and specifically, channelization of a wideband radio frequency signal into multiple narrowband channels, for example, for the purposing of detecting signals in each of the narrower bands.

BACKGROUND OF INVENTION

There is an increasing need for monitoring across ultra-wideband radio frequency (RF) spectra. Electronic solutions are limited in their operating bandwidth.

SUMMARY OF INVENTION

Shortcomings of the prior art are overcome and additional advantages are provided through a method for channelization of a wideband radio frequency signal into multiple narrowband channels. In one embodiment, the method includes: obtaining, through electrical-to-optical frequency conversion, a dual-banded optical signal, wherein the dual-banded signal is a translated wideband radio frequency signal, and wherein the dual-banded signal comprises a signal and an idler; modifying, by the spectral phase mask, the spectral phases of at least one of the signal or the idler, wherein the modifying produces a spectral phase-modulated output comprising at least one of a spectrally-modulated signal or a spectrally modulated idler; outputting, by the spectral phase mask, the spectrally modulated output to an optical phase sensitive amplifier; receiving, by the optical phase sensitive amplifier, the spectrally modulated output; and either amplifying or de-amplifying, by the optical phase sensitive amplifier, each component of the spectrally modulated output, the amplifying or the deamplifying of each component based on a relative spectral phase modulation of each component, wherein the either amplifying or deamplifying produces a filtered signal and a filtered idler band.

In some embodiments of the present invention, the method also includes: outputting, by the optical phase sensitive amplifier, at least one of the filtered signal or the filtered idler band to an optical filter; receiving, by the optical filter, at least one of the filtered signal or the filtered idler band; spatially separating, by the optical filter, at least one of the filtered signal or the filtered idler band into channels; and down-converting the channels to narrowband intermediate frequency channels by combining each channel of the spatially-separated narrowband channels with a local oscillator.

Shortcomings of the prior art are overcome and additional advantages are provided through a system for channelization of a wideband radio frequency signal into multiple narrowband channels. In one embodiment, the system includes: a spectral phase mask, configured to obtain a dual-banded optical signal from a signal converter, wherein the dual-banded signal is a translated wideband radio frequency signal, and wherein the dual-banded signal comprises a signal and an idler, to modify the spectral phases of at least one of the signal or the idler, wherein the modifying produces a spectrally modulated output comprising at least one of a spectrally-modulated signal or a spectrally modulated idler, and to output the spectrally modulated output to an optical phase sensitive amplifier; and the optical phase sensitive amplifier, configured to receive the spectrally modulated output from the spectral phase mask, and to either amplify or de-amplifying each component of the spectrally modulated output, the amplifying or the deamplifying of each component based on a relative spectral phase modulation of each component, wherein the either amplifying or deamplifying produces at a filtered signal and a filtered idler band.

In some embodiments of the present invention, the system may also include: an optical filter, wherein the optical phase sensitive amplifier is further configured to output the at least one of the filtered signal or the filtered idler band to the optical filter, and the optical filter is configured to receive the at least one of the filtered signal or the filtered idler band to an optical filter and to separate the at least one of the filtered signal or the filtered idler band into channels. In an embodiment of the present invention, the system may also include: a down-converter configured to down-convert the channels to narrowband intermediate frequency channels by combining each channel of the spatially-separated narrowband channels with a local oscillator.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

FIGS. 3A-3B depict certain aspects of an embodiment of the present invention.

FIG. 4 depicts certain aspects of an embodiment of the present invention.

DETAILED DESCRIPTION OF THE INVENTION

Figure 1:
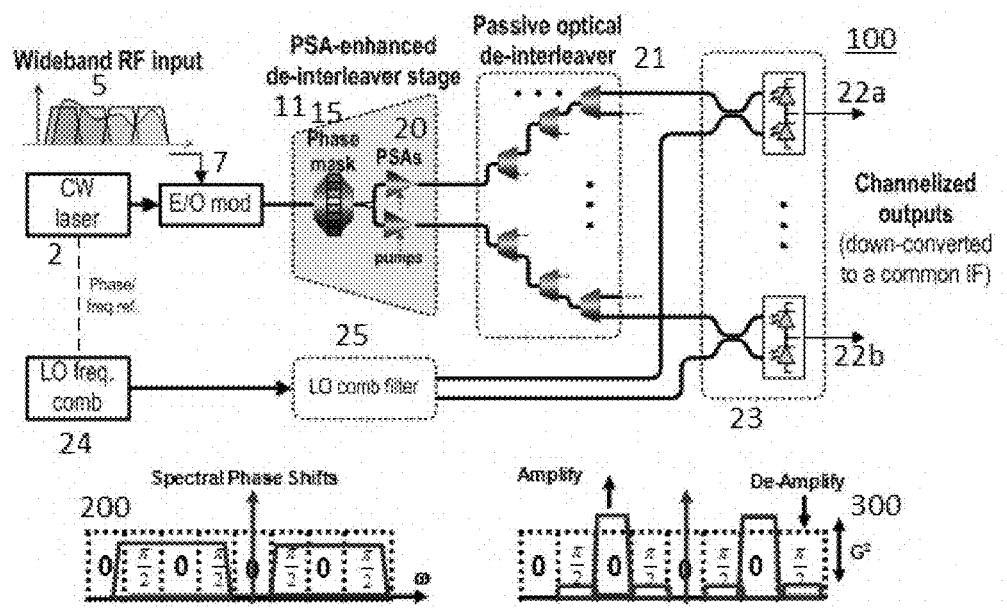
FIG. 1 depicts certain aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

An advantage of certain embodiments of the present invention is that it addresses the problem of channelization of a wideband RF signal into multiple narrowband IF channels to detect signals in each of the narrower bands. Aspects of the present invention enable electronic signal processing applications, including but not limited to, cueing operations, spectral monitoring, and signal characterization. In certain embodiments of the present invention, channelization is accomplished that provides advantages over complex microwave filtering circuitry and current high-speed electronic analog-to-digital conversion (ADC) because these embodiments utilize lower bandwidth ADCs to overcome the resolution-bandwidth limitation of current electronic ADCs.

Embodiments of the present invention provide a system and method for monitoring across an ultra-wideband RF spectrum approaching, for example, 50-100 GHz. Photonics employed in embodiments of the present invention offer ultra-wideband operation and low SWAP (size, weight, and power) potential. In embodiments of the present invention, the photonic channelization aspect in the systems and methods disclosed enables ADCs with continuous coverage over a wide instantaneous RF bandwidth and a large dynamic range.

Embodiments of the present invention provide various advantages by applying photonics to analog radio frequency (RF) signal processing, including ultrawideband operation, tunability, and size, weight, and power benefits. As demonstrated in embodiments of the present invention, these photonics may include filtering, low-noise amplification, frequency translation, switching, and channelization. A challenge of incorporating optical filters into various applications include insertion loss, scalability, and bandwidth flexibility. Loss is in analog systems leads to degradation in the system spurious free dynamic range (SFDR) and noise figure (NF), however, embodiments of the present invention mitigate the impact of filter insertion loss on system performance by utilizing phase-sensitive amplification, which provides low-noise gain for the passband signal and simultaneously suppresses the stopband signals with high extinction. Thus, embodiments of the present invention provide low noise optical gain for the passband signals, and the realization of filtering in the optical domain which enables further downstream optical signal processing.

In general, phase-insensitive (PI) and phase-sensitive (PS) parametric amplification are made possible by degenerate four-wave mixing (FWM), in which a strong pump wave (p) drives weak signal (s) and idler (i) waves (sidebands). In the absence of pump depletion, the sideband evolution is governed by standard input-output (IO) equations, including Equations 1-2 below, where Equation 1 is an input amplitude, Equation 2 is an output amplitude. The transfer coefficients are noted in Equations 3-4.

$$B_s = e\mu A_s + e\nu A_i^*, \quad \text{Equation 1}$$

$$B_i^* = e\nu^* A_s + e\mu^* A_i^*, \quad \text{Equation 2}$$

$$\mu = \cos(kl) + j\delta \sin(kl)/k, \nu = j\gamma \sin(kl)/k, \quad \text{Equation 3}$$

$$e = \exp[j(\beta_s - \beta_i)1/2], \quad \text{Equation 4}$$

The interaction wavenumber $k=(\delta^2-|\gamma|^2)^{1/2}$, where the wavenumber mismatch $\delta=(\beta s+\beta i)/2-\beta p+|\gamma|$, and $\gamma = \gamma K A_p^2 \cdot \beta K$, l, and j are the linear wavenumber, fiber nonlinear coefficient, amplifier length, and $\sqrt{-1}$, respectively. $A_p$ captures the impact of the pump phase on the amplifier characteristics.

Consider a composite device that consists of a parametric amplifier ($\mu_1, \nu_1$) followed by an attenuator, a phase shifter and another parametric amplifier ($\mu_2, \nu_2$). The first amplifier copies the signal (generates a conjugated idler) in a PI manner, the attenuator multiplies the signal and idler amplitudes by the transmission factors $\tau_s$ and $\tau_i$, the phase shifter multiplies the amplitudes by the phase factors $e_s$ and $e_i$, and the second amplifier combines the sidebands in a PS manner. By combining the IO equations for the constituent devices, one obtains the composite IO equations, Equations 5-6, below.

$$B_s = (\mu_2 e_s \tau_s \mu_1 + \nu_2 e_i^* \tau_i^* \nu_1^*) A_s + (\mu_2 e_s \tau_s \nu_1 + \nu_2 e_i^* \tau_i^* \mu_1^*) A_i^* \quad \text{(Equation 5)}$$

$$B_i^* = (\mu_2^* e_i^* \tau_i^* \nu_1^* + \nu_2^* e_s \tau_s \mu_1) A_s + (\mu_2^* e_i^* \tau_i^* \mu_1^* + \nu_2^* e_s^* \tau_s \nu_1) A_i^* \quad \text{(Equation 6)}$$

The common phase factor $e_1 e_2$ from was omitted from composite IO equations because it does not affect the performance of the device. The coefficients e, $\mu$, $\nu$ and $\tau$ are complex, and one can maximize both the output signal and idler powers by choosing the sideband phase shifts such that Equation 7 where $\varphi s = \arg(e_s)$, etc.

$$\varphi_s + \varphi_i = \varphi_{\nu 2} - \varphi_{\nu 1} - \varphi_{\mu 2} - \varphi_{\mu 1} - \varphi_{\tau s} - \varphi_{\tau i} \quad \text{(Equation 7)}$$

One can minimize the signal and idler powers (i.e. maximum de-amplification) by changing the sum of the sideband phases by $\pi$. When these conditions are satisfied, the signal-signal transfer coefficients $\mu\pm=\mu_2\tau_s\mu_1\pm\nu_2\tau_i\nu_1$ depend on only the moduli of the constituent coefficients. For balanced sidebands ($\tau_s\mu_1=\tau_i\nu_1=\lambda$), $\mu+=\lambda(\mu_2+\nu_2)$, whereas $\mu-=\lambda(\mu_2-\nu_2)=\lambda/(\mu_2+\nu_2)$. The optical power contrast ratio, or filter extinction, $(\mu+/\mu-)^2=(\mu_2+\nu_2)^4=G^2_{PSA}$. $G_{PSA}$ is the internal PS gain of the second amplifier, which is equal to four times the PI gain. Note that the idler has the same contrast ratio.

As further described in reference to FIG. 1, embodiments of the present invention accomplish channelization in part, by utilizing a hybrid filter channel bank (HFCB) (e.g., FIG. 1, 21). At the HFCB output, the input signal (e.g., a filtered wide bandwidth signal from the phase-sensitive amplifier output) is spatially separated into its constituent narrow-bandoptical channels. Embodiments of the present invention spatially demultiplex the RF signal spectrum by utilizing these high-resolution optical filtering elements. For example, embodiments of the present invention apply optical phase sensitive amplifiers (PSAs) to relax the (challenging) requirements of out-of-band rejection of ultra-narrow-band optical filters.

PSAs are a special class of optical parametric amplifiers where the gain experienced by an input signal depends on its optical phase, relative to the other injected optical frequencies. Due to their theoretical noise figure (NF) of 0 dB, PSAs have been considered for both digital and analog links. In fact, an advantage that a PSA provides over phase-insensitive amplifiers is this low theoretical NF. To maximize the benefit of low NF, PSAs are usually operated in the regime of maximum amplification. However, PSAs are also capable of de-amplifying signals. Embodiments of the present invention leverage both the amplifying and de-amplifying properties of PSAs to enable their use as optical filters such that passband signals experience amplification while the stop-band (notch) is created through de-amplification. This dual amplification and de-amplification of signals by PSAs can be utilized in both analog and digital embodiments of the present invention. The method in which PSAs are utilized in embodiments of the present invention enable ultra-high filter extinctions, which reduces the demand on passive optical filters and subsequent electronics to provide channel isolation. As will be discussed in more detail later, a PSA is a parametric amplifier based on a nonlinear optical response where the gain depends on the relative phase relationship of the optical inputs. For a certain phase condition of the input signal relative to the pump, the gain is maximized, whereas for a separate phase relationship, the PSA can deamplify the input optical signal. Thus, PSAs have the unique potential for noiseless amplification.

In embodiments of the present invention, a PSA is utilized to construct a signal filter as the phase-sensitive nature of the PSA is used to realize optical filtering. An advantage of using the PSA in this manner is that it greatly reduces the demand on passive optical filters and subsequent electronics to provide channel isolation. In embodiments of the present invention, the image rejection metric is achieved through both the inherent out-of-band rejection from high resolution passive optical filters and from PSA-enhanced extinction.

Embodiments of the present invention accomplish RF photonic channelization by utilizing optical phase-sensitive amplification, optical filtering, and intermediate frequency (IF) downconversion to enable ADCs. Embodiments of the present invention further differ from a conventional approach to photonic-enabled ADCs because rather than using a mode locked laser to sample the data, embodiments of the present invention utilize HFCB technique for photonic-enabled ADCs, which utilize high-resolution optical filters.

FIG. 1 is an example of a system architecture utilizing aspects of embodiments of the present invention for RF channelization using phase-sensitive amplification and passive de-interleaver-based optical filtering for maximum filter extinction. As will be explained later, both passive and active optical filtering can be utilized in embodiments of the present invention. Additionally, embodiments of the present invention combine a filtering operation with coherent down-conversion.

Referring to FIG. 1, a wideband RF input 5 is injected into an electro-optic (E/O) modulator 7. In this system 100, a continuous wave (CW) laser 2 is input to the E/O modulator 7. The modulated signal progresses to a PSA-enhanced de-interleaver stage 11, which includes a phase mask 15 and a PSA 20. In the PSA-enhanced de-interleaver stage 11, the phase mask 15 imprints a spectral phase modulation across different frequency bands on the modulated signal and the result is injected into the PSA 20, which will convert this spectral phase modulation into amplitude modulation at its output, resulting in a filtered signal. The inclusion of the phase mask 15 (e.g., spectral phase filter), enables the PSA 20 both to amplify and to de-amplify the signal. Signal amplification/deamplification in the PSA 20 is based on a nonlinear optical response whose gain depends on the relative phases of the input signal and PSA pumps and in the embodiment of FIG. 1, the PSA is used to provide low-noise gain to the desired signal channels in the upconverted double-sideband RF signal, and simultaneously suppress the undesired signal channels. The optical sidebands are phase conjugates of each other, which is optimal for maximum PSA gain (G). This gain is used to offset the loss in the signal path and improve the photonic link performance.

Element 200 of FIG. 1 illustrates how in a portion of the system 100 in FIG. 1, conjugated signal sidebands are modulated by a spectral phase filter comprising phase mask 15, and then, as seen in element 300, alternating channels are either amplified or de-amplified by the PSA 20.

In embodiments of the present invention, a PSA-enhanced de-interleaver stage 11 may include a phase mask 15 (a spectral phase mask) that includes a spectral phase filter in combination with a PSA. This may be followed by a cascade of optical filters that spatially de-interleave the channels. By using a spectral phase filter before the PSA 20, embodiments of the present invention may utilize the amplification and de-amplification properties of the PSA 20.

In one non-limiting example, an all-pass filter applies an alternating phase mask to ~200 MHz frequency bins of the optical signal spectrum, resulting in the amplification of even channels and de-amplification of odd channels, as seen in element 300 of FIG. 1. This alternating amplification and de-amplification of the channels leads to an effective optical gain-squared extinction between the odd and even channels. Then, two parallel PSA+de-interleaver paths provide all of the odd and even channels at the output. Thus, as aforementioned, the use of PSAs in combination with a spectral phase filter greatly relaxes the requirements on the optical filter out-of-band rejection, enabling the use of lower-order filters.

Returning to FIG. 1, in this embodiment, from the PSA 20, the now-filtered signal progresses to a passive optical de-interleaver stage 21, which comprises optical filters that spatially separate the filtered signal into narrowband channels. After spatially separating the RF signal, embodiments of the present invention perform coherent down-conversion for each channel using an optical LO to recover RF phase and amplitude. As illustrated in FIG. 1, passive optical de-interleaver stage 21 outputs multiple channels, which are each combined with a local oscillator (at 23) in order to downconvert the input into a multiple channel IF output 22a-22b.

In the embodiment of FIG. 1, the oscillators that are combined with the multiple signals output by the filters in the passive optical de-interleaver stage 21 are generated by a local oscillator (LO) frequency comb 24 and separated into the individual oscillators for combination with the individual multiple channels by an LO frequency comb filter 25. Generating the local oscillators using optical frequency combs 24 allows down-conversion of all channels to a common IF. In embodiments of the present invention, the local oscillators may be generated using either a mode-locked laser (MLL) or a sinusoidally-driven phase modulator cascade. A MLL uses active control while a sinusoidally-driven phase modulator can employ the same laser as used for the RF signal, simplifying requirements on the control.

Passband IF down-conversion can be utilized in embodiments of the present invention due to passband operation of optical filtering (i.e. a local oscillator is offset from the center of the filter) and the coherent downconversion architecture utilized in the embodiments. The passband IF down-conversion can be accomplished, as aforementioned, by combining local oscillators (e.g., generated by LO frequency comb 24 and spatially separated by LO comb filter 25), with the multiple channels created by utilizing optical filters (e.g., in a passive optical de-interleaver stage 21) to spatially separate the filtered signal into multiple channels. Embodiments of the present invention utilize coherent downconversion, while traditionally, RF photonic links have employed intensity detection rather than coherent detection due to its simplicity. In embodiments of the present invention utilizing a passband IF down-conversion allows down-conversion to a flexible IF, requiring half the number of IF channels and using simpler receivers compared to the baseband I-Q approach (i.e. where the local oscillator is positioned at the center of the optical filter passband).

Figure 2:
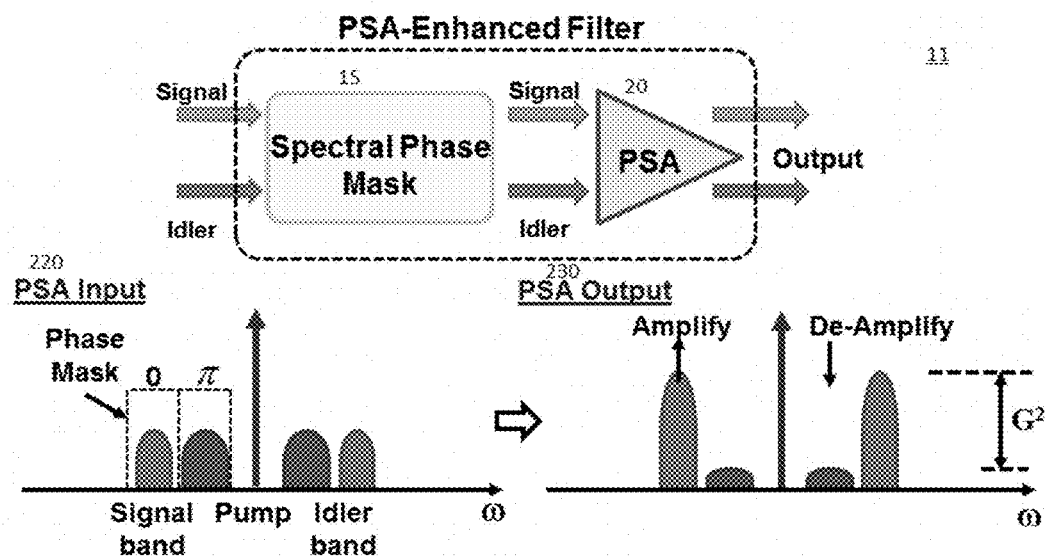
FIG. 2 depicts certain aspects of an embodiment of the present invention.

Embodiments of the present invention utilize a PSA to construct a signal filter. Thus, FIG. 2 illustrates the PSA-enhanced de-interleaver stage 11, which includes this aspect of the present invention. Before being received by the spectral phase mask 15, a signal converter translates an input signal into a dual-banded optical signal, labeled as signal and idler. As understood by one of skill in the art, this signal converter may include, but is not limited to an optical modulator converting an input RF signal into a dual sideband optical signal, or a parametric phase-insensitive amplifier (PIA) wavelength creating a conjugate copy of the input optical signal. The spectral phase mask 15 receives the optical signal and modifies one or both of their spectral phases of the idler and/or the signal across their bandwidths relative to the PSA pump phase. The spectrally-modulated signal and/or idler bands are then input to the PSA 20. Each of the constituent spectral components within the signal and/or idler bandwidths will be either amplified or de-amplified by the PSA 20, depending on the relative spectral phase modulation. The output is filtered signal and idler bands with a filter extinction. FIG. 2 also illustrates the PSA input 220 (the signal as modified by the spectral phase mask 15) and the PSA output 230 (the amplified and de-amplified signals).

As illustrated in FIG. 2, the spectral phase mask 15 received an optical input that is dual-banded (i.e., a signal and an idler, conjugate around the pump wavelength). A spectral phase mask is applied across the signal band. Depending on the spectral phase applied, each of the frequency bins (of both signal and the corresponding idler bands) are either amplified or de-amplified by a factor G in the following PSA 20 when the input signal and idlers are balanced in power. As depicted in FIG. 2, G is the internal gain of the PSA (which is about 4 times larger than the corresponding phase-insensitive gain). This amplification (de-amplification) results in the creation of filter pass (stop)-bands with a net extinction of $G^2$. This extinction can be further enhanced by unbalancing the input signal and idler powers to the PSA.

FIGS. 3A-3A illustrate an example of individual filter elements in that can be included in the de-interleaver. Specifically, FIGS. 3A-3A illustrate a filter design and the simulated transfer function for a 4th-order elliptic filter with 50% duty cycle, passband ripple <0.1 dB, and optical out-of-band rejection of 30 dB.

As aforementioned, there exists a challenge in implementing high out-of-band rejection filters as even higher order filters would be required in each stage to achieve out-of-band rejections >30 dB. For example, a 500 MHz free spectral range (FSR) utilizes a 2 ns time delay in each ring corresponding to 20 cm delay assuming a refractive index of 3. Higher-order filters can complicate the control of an increasingly larger number of elements making it more complex. However, as described above, the use of PSAs in combination with a spectral phase filter greatly relaxes the requirements on the optical filter out-of-band rejection, enabling the use of lower-order filters.

Filters utilized in embodiments of the present invention utilize ultra-low loss waveguide technology. As shown in FIG. 3(b), for typical waveguide losses of 0.1 dB/cm, the filter loss is 2 dB and cascading such filters will significantly alter the overall transfer function. With ultra-low loss waveguide technology (e.g. 0.001 dB/cm in DARPA iPhod), filter loss is only 0.02 dB and the transfer function resembles the lossless case.

In an embodiment of the present invention, photonic integration minimizes the system SWAP, and simplifies the task of phase alignment for laser, phase shifter, and filter elements. Embodiments of the present invention may include a ring resonator-based phase mask, which, by design, minimizes differential paths between spectral components. Certain embodiments of the present invention may utilize active control. For example, stable coherence between 10 GHz-spaced spectral bands in a thermally-stabilized element can be maintained without active control. However, to maintain signal fidelity with 200 MHz channel spacing, active control is utilized.

Embodiments of the present invention can be utilized in systems and methods other than those that perform RF channelization. One or more aspects of the present inventions could be utilized in applications where high extinction, reconfigurable filters are utilized for either RF or optical signal processing applications. For example, interference mitigation is utilized in modern RF communications systems, which have dynamically changing operating frequencies, such as cognitive radios, or for wideband systems, such as ultrawideband radio, and modern for radar. To protect sensitive RF receivers in these systems, frequency agile RF filters that can remove interferers or jammers with large variations in frequency, power, and bandwidth are sought, and can be provided by utilizing aspects of embodiments of the present invention. Other examples of uses for aspects of the present invention include, but are not limited to EW systems, filter banks, ADCs for analog signal processing, digital communications with high order modulation formats, antenna remoting, radio astronomy, 5G/mobile content distribution, and spectrum analyzers.

Embodiments of the present invention enhance the out-of-band rejection of optical filters using phase sensitive amplification and deamplification with slightly unequalized input signal and idler powers. A benefit of the PSA-based filter presented in embodiments of the present invention is that it provides gain for the desired signal along with spectral filtering. Also, the four-wave mixing nonlinear process used in embodiments of the present invention permits a great deal of flexibility on the filter's center frequency and bandwidth.

Also, by utilizing aspects of embodiments of the present invention, the signals remain in the optical domain after the filter, allowing for the possibility of further downstream optical signal processing. FIGS. 4-8 demonstrate these advantages by utilizing a spectral phase mask followed by a PSA to demonstrate filtering operation. As understood by one of skill in the art, higher resolutions are achievable with alternative filter architectures (for example, Ref [3]). PSAs can also exhibit large-gain bandwidths, allowing optical filters with ultrawideband frequency tuning over multiterahertz ranges.

FIG. 4 depicts certain aspects of an embodiment of the present invention, including aspects also illustrated in FIG. 2. Specifically, FIG. 4 illustrates the operation of a four-wave-mixing-based PSA 20 in an embodiment of the present invention. As seen in FIG. 4, an RF signal 410 (i.e., input) is upconverted with an E/O modulator 7 to an optical frequency, and then a signal converter 420 translates the input optical signal into a dual-sideband optical signal. In various embodiments of the present invention, the type of signal converter 420 could include, but is not limited to a parametric phase insensitive amplifier (PIA) that wavelength converts the input optical signal.

As illustrated in FIG. 4, a signal signal converter 420 translates an input signal into a dual-banded optical signal which is conjugate symmetric around a center frequency (by convention, the two sidebands are labeled as "signal" and "idler"). In embodiments of the present invention, the signal converter 420 includes, but is not limited to, an optical modulator upconverting an input radio frequency (RF) signal into a dual sideband optical signal, or a parametric phase-insensitive amplifier (PIA) wavelength converting a modulated input optical signal. In embodiments of the present invention, the choice of signal coverter 420 does not impact the overall noise performance of the PSA-based (also called PSA-enhanced) filter. As seen in FIG. 4, one or both of the signal and idler bands have their spectral phases modified across their bandwidths using a spectral phase mask 15, $\Phi_M(\omega)$. The maximum optical power contrast between amplified and de-amplified spectral components at the PSA output, can be calculated using Equation 8, below. In Equation 8, $T_{fiber}$ and $G_{PSA}$ are the fiber transmittance (e.g., less than or equal to 1) and internal PSA gain, respectively. The filter performance in the electrical domain can then attain contrasts of $G^4_{PSA}$. While the PSA output passband signals will scale with the net gain of the amplifier (i.e., $G_{PSA} T_{fiber}$) the output power contrast, or filter extinction, is independent of $T_{fiber}$. Thus, in embodiments of the present invention, PSA gain can be used to simultaneously boost output power of the desired signal spectrum, while suppressing undesired signal components. Because parametric amplifiers have been demonstrated with large gains, embodiments of the present invention can utilize extremely large filter extinction ratios.

$$\frac{P_{amp}}{P_{de-amp}} = \frac{P_{in} G_{PSA} T_{fiber}}{\frac{P_{in}}{G_{PSA}} T_{fiber}} = G^2_{PSA} \quad \text{(Equation 8)}$$

As illustrated in FIG. 4, the output of the signal converter includes a signal and a conjugated idler sidebands centered around a particular pump frequency. In an embodiment the present invention, a spectral phase mask 15 is applied across the signal sideband and/or the idler sideband. Depending on the spectral phase applied, each of the frequency bins (both the signal and corresponding idler bands) are either amplified or deamplified by a factor G in the following PSA 20, when the input signal and idler sidebands are balanced in power. In this example, G is the maximum phase-sensitive gain of the PSA. This amplification (deamplification) results in the creation of filter pass-(stop-)bands with a net power extinction of G2 in the optical domain. After the PSA, the idler sideband is selected for optical-to-electrical (O/E) conversion.

In embodiments of the present invention, the extinction is enhanced beyond G2 by slightly imbalancing the input signal and idler powers to the PSA.

The Equations below demonstrate that the gain of a PSA may depend on the relative input phase. This phase is represented by Item 1 below. Setting the relative input phase allows the PSA operation to be set for maximum amplification or minimum amplification (i.e., maximum deamplification).

$$2\theta_p - (\theta_s + \theta_i) \quad \text{(Item 1)}$$

In an embodiment of the present invention, the output of a PSA employing a single pump with nondegenerate signal and idler can be derived utilizing Equation 9 below.

$$|A_S(z)|^2 = |\mu|^2 |A_S|^2 + |\nu|^2 |A_I|^2 + 2|\mu\nu||A_S A_I|\cos(\theta_\nu - \theta_\mu - \theta_s - \theta_i),$$

$$|A_I(z)|^2 = |\mu|^2 |A_I|^2 + |\nu|^2 |A_S|^2 + 2|\mu\nu||A_S A_I|\cos(\theta_\nu - \theta_\mu - \theta_s - \theta_i), \quad \text{(Equation 9)}$$

In Equation 9 above, pump depletion and linear propagation losses are neglected, $A_S$ and $A_I$ are signal and idler input amplitudes, and $A_S(z)$ and $A_I(z)$ are output amplitudes after distance z, respectively. Additionally, the conditions of Equation 10 apply.

$$\mu = e^{\frac{i}{2}[\Delta\beta + 2\gamma P]z} \left\{ \cosh(gz) - \frac{i}{2g}(\Delta\beta - 2\gamma P)\sinh(gz) \right\}, \quad \text{(Equation 10)}$$

$$\nu = i e^{\frac{i}{2}[\Delta\beta + 2\gamma P]z} \frac{\gamma P}{g} e^{2i\theta_p} \sinh(gz).$$

Equation 11 is the total wavenumber match, Equation 12 is the gain coefficient, P is pump power, $\Delta\beta$ is the dispersive wavenumber mismatch. The terms $\theta_\mu$ and $\theta_\nu$ are arguments of $\mu$ and $\nu$.

$$|\mu|^2 - |\nu|^2 = 1, k = \Delta\beta - 2\gamma P \quad \text{(Equation 11)}$$

$$g = \sqrt{(\gamma P)^2 - 1/4(\Delta\beta - 2\gamma P)^2} \quad \text{(Equation 12)}$$

As discussed above, embodiments of the present invention may utilize both balanced and unbalanced input signals and idler amplitudes. For balanced input signal and idler amplitudes, the maximum and minimum gain for both signal and idler may be computed as Equations 14-15, respectively. As seen in Equation 15, the optical power contrast, which is the ratio of maximum to minimum output optical power, can be calculated from the ratio of the values produced by equations 14 and 15 to give a value Equation 15 where G is the PSA optical gain, as described previously.

$$G^{max} = ||\mu| + |\nu||^2 \quad \text{(Equation 13)}$$

$$G^{min} = 1/G^{max} = ||\mu| - |\nu||^2 \quad \text{(Equation 14)}$$

$$G^{max\,2} = G^2 \quad \text{(Equation 15)}$$

In contrast, in the case of an unbalanced input signal and idler, the input idler amplitude is slightly smaller than the input signal amplitude, as seen in Equation 16. The maximum and minimum idlers are given by Equation 17 and Equation 18. The idler power contrast is infinite as the minimum idler gain is zero when Equation 19 is true. The corresponding maximum and minimum signal gain are defined by Equation 20 and Equation 21. For conditions defined in Equation 19, the optical power contrast on the signal sideband is finite and of the order of $(G/2)^2$. The different power contrasts on the signal and the idler sideband is not an issue in analog applications since the signal and idler are conjugated copies. Thus, in embodiments of the present invention, which includes photonically enabled RF filtering, only one of the signal and idler sidebands is detected, as illustrated in FIG. 4.

$$A_S = \sqrt{x} A_I \quad \text{(Equation 16)}$$

$$G_I^{max} = \left\| |\mu| + \sqrt{x} |v| \right\|^2 \quad \text{(Equation 17)}$$

$$G_I^{min} = \left\| |\mu| - \sqrt{x} |v| \right\|^2 \quad \text{(Equation 18)}$$

$$\sqrt{x} = |\mu/v|, \quad \text{(Equation 19)}$$

$$G_S^{max} = \left\| |\mu| + \frac{|v|}{\sqrt{x}} \right\|^2 \quad \text{(Equation 20)}$$

$$G_S^{min} = \left\| |\mu| - \frac{|v|}{\sqrt{x}} \right\|^2 = \frac{1}{|\mu|^2} \quad \text{(Equation 21)}$$

Figure 5:
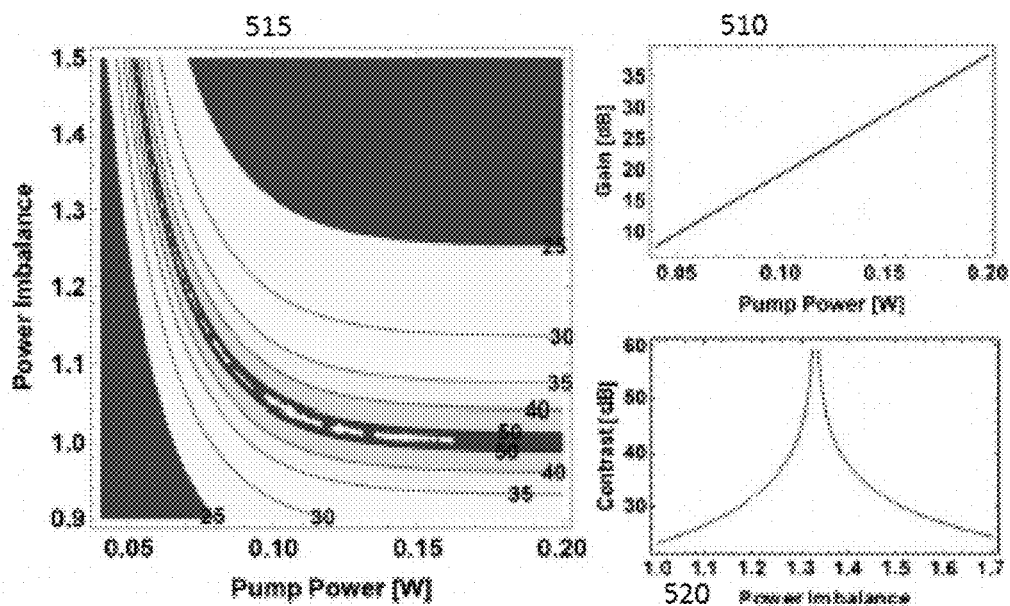
FIG. 5 illustrates is a contour plot relevant to certain aspects of embodiments of the present invention.

FIG. 5 illustrates is a contour plot of the idler optical power contrast ratio (in decibels, dB) as a function of the pump power and the signal-idler input power imbalance, x. For simplicity, in this example, for illustrative purposes, wavenumber matching is assumed so that k=0. In addition, γ=11/(W*km) and z=2 km. For reference, the maximum PSA gain as a function of pump power when signal-idler inputs are equal is also shown (top right). Thus, FIG. 5 indicates that optimizing the input power imbalance can result in significantly higher optical power contrast ratios beyond $G^2$ for low and moderate-gain PSAs. As the pump power is increased, the optimum power imbalance approaches one. Also shown in FIG. 5 (as an example) is the idler optical power contrast ratio as a function of the signal-idler input power imbalance for a specific pump power of ~18 dBm (63 mW) (bottom right).

As seen in FIG. 5, the contour plot 515 shows the idler optical power contrast in dB as a function of PSA pump power and input signal-idler power imbalance. In this plot, the maximum PSA gain is shown as a function of pump power 510.

Figure 6:
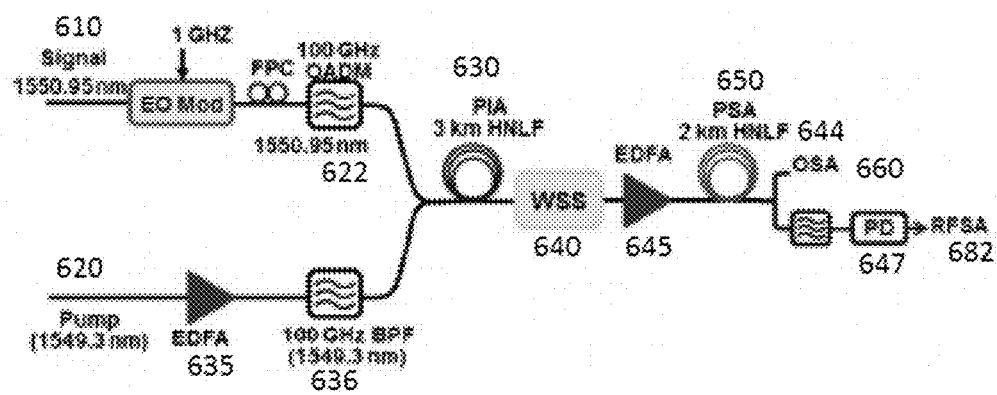
FIG. 6 depicts certain aspects of an embodiment of the present invention.

FIG. 6 is another embodiments of the present invention where a PSA enables photonics-based channelization. As seen in FIG. 6, this embodiment of the present invention is electro-optic (EO) and includes an optical add-drop multiplexer (OADM) 622, a phase-insensitive amplifier (PIA) 630, a highly nonlinear fiber (HNLF) 644, a phase-sensitive amplifier (PSA) 650, more than one erbium-doped fiber amplifier (EDFA) 645, 635, a bandpass filter (BPF) 636, a Waveshaper® (WSS) 630, an optical spectrum analyzer (OSA) 660, a photodiode (PD) 647, and an RF spectrum analyzer (RFSA) 682. Although a WSS is utilized in certain embodiments of the present invention, as understood by one of skill in the art, an optical processor can be utilized in embodiments of the present invention where a WSS is included in the embodiments.

This embodiment can be utilized to contrast the amplification and deamplification modes for equal and unequal input signal and idler powers. In the pictured embodiment, the output of a distributed feedback (DFB) laser at 1550.95 nm is externally modulated with a 1 GHz sinusoid to form the signal 610. Meanwhile, the pump is obtained from a separate DFB laser at 1549.3 nm and is amplified to 18 dBm (63 mW). The pump 620 is combined with the signal 610 and input to a PIA 630, which consists of a 3 km length of highly nonlinear fiber (HNLF) with a nonlinear coefficient of 10 $W^{-1}$ $km^{-1}$ and a zero dispersion wavelength of ~1580 nm. In this example, the PIA 630 generates a phase-conjugated copy of the signal at the idler frequency 1547.65 nm. The PIA 630 is followed by a Finisar WaveShaper® (WSS) 640, which is used to implement the spectral phase mask and set the relative powers of the input signal and idler to the PSA 650. In some embodiments of the present invention, dispersion that might be introduced by fiber or components between the PIA 630 and the PSA 650 can also be compensated by the WSS, 640, within its spectral resolution.

The gain of the PSA 650 depends on the relative phases of the input pump, signal, and idler. In this embodiment, when the pump phase is set in the WSS 640 to maximize the gain in the PSA 650. The WSS 640 applies a spectral phase mask across a bandwidth of 1.6 nm, centered at the signal band at 1550.95 nm, thus allowing adjustment of the relative phases of the signal and idler. In an embodiment of the present invention, the spectral phase mask consists of approximately 0 and π radian phase shifts applied to each frequency bin on the signal band relative to the idler band, where the phase is held constant. Signals in a bin with 0 phase shift relative to the idler experience maximum amplification, while signals in a bin with π relative phase shift experience deamplification (minimum amplification) in the PSA. Similar amplification behavior may be experienced in the corresponding idler bins, though, in this embodiment, the phase mask is not applied on the idler bins (i.e., all idler bins have a phase shift of 0). In embodiments of the present invention, the signal and idler power imbalance at the input to the PSA 650 is also adjusted using the WSS 640.

In embodiments of the present invention, the output of the WSS 640 is sent to an erbium-doped fiber amplifier (EDFA) 645 followed by a pump-degenerate PSA 650. In this embodiment, as a non-limiting example, the PSA 650 comprises a 2 km length of HNLF with a nonlinear coefficient of 11 $W^{-1}$ $km^{-1}$, a zero dispersion wavelength of 1540 nm, a dispersion slope at 1550 nm of 0.02 ps/nm2/km, and a loss of 2 dB. The pump power into the PSA is set to 17.5 dBm, while the power in each of the signal and idler bands is ~−10 dBm. These powers result in an internal PSA gain of 10 dB, yielding a contrast of 20 dB between the amplified and deamplified modes when the input signal and idler are equalized in power. The PSA output is monitored using an optical spectrum analyzer (OSA) and an RF spectrum analyzer (RFSA) after filtering and photodetection. (The linewidths of DFB lasers are simultaneously broadened by ~1 GHz to suppress stimulated Brillouin scattering in the HNLFs.)

Figure 7:
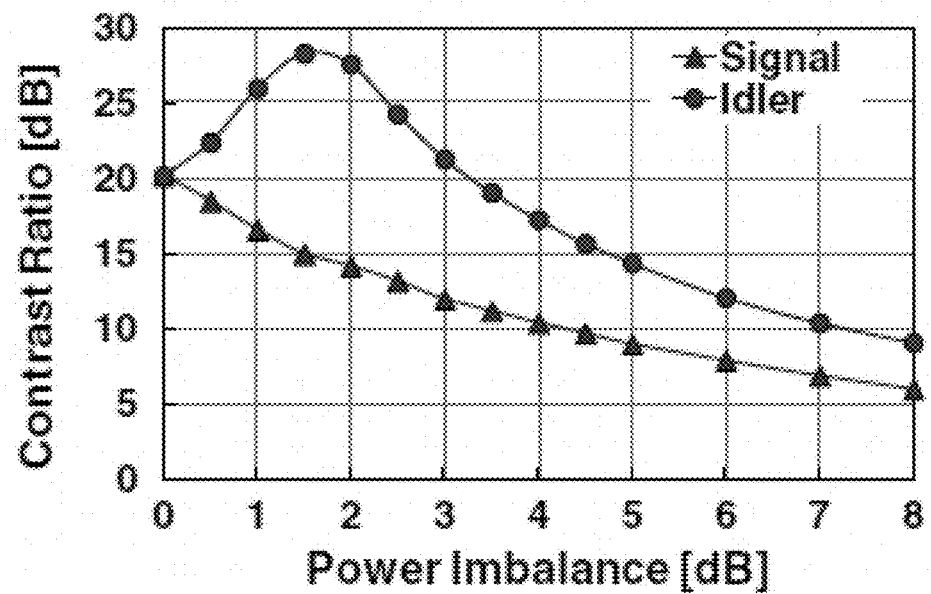
FIG. 7 illustrates the optical power contrast ratio between PSA amplification and deamplification modes for equal and unequal input signal and idler powers in an embodiment of the present invention.

FIG. 7 illustrates the optical power contrast ratio between PSA amplification and deamplification modes for equal and unequal input signal and idler powers. FIG. 7 illustrates the measured contrast ratio for both signal and idler bands as a function of input power imbalance. The input idler is attenuated slightly with respect to the input signal. As such, FIG. 7 plots the contrast ratio for both signal and idler wavelengths as a function of input power imbalance. The measured contrast ratio is 20 dB for both signal and idler, as expected for a PSA gain of 10 dB and when signal and idler input powers are balanced. To unbalance the input powers, one attenuates the idler with respect to the signal wavelength in the WSS 640 (FIG. 6). As shown in this non-limiting example, the measured contrast ratio for the idler reaches a maximum of 29 dB for an input power imbalance of 1.5 dB. The contrast ratio for the signal sideband drops as the power imbalance is increased. However, in this example, only the idler sideband was selected for O/E conversion.

Returning to FIG. 6, when utilizing aspects of an embodiment of the present invention, to measure the optical transfer function of the PSA-based filter, the signal DFB laser and the modulator utilized in FIG. 6 are replaced by an external cavity laser that is swept in wavelength from 1550.7 to 1551.4 nm. In this embodiment, the WSS 640 applies a spectral phase mask of 0 and π radian phase shifts on the signal band relative to the idler band. Both the signal and idler accordingly experience either amplification or deamplification in the PSA 650, resulting in the creation of filter pass and stop-bands. To obtain the optical transfer function, the PSA 650 input and output powers are recorded at the signal and idler wavelengths on the OSA 660.

Figure 8:
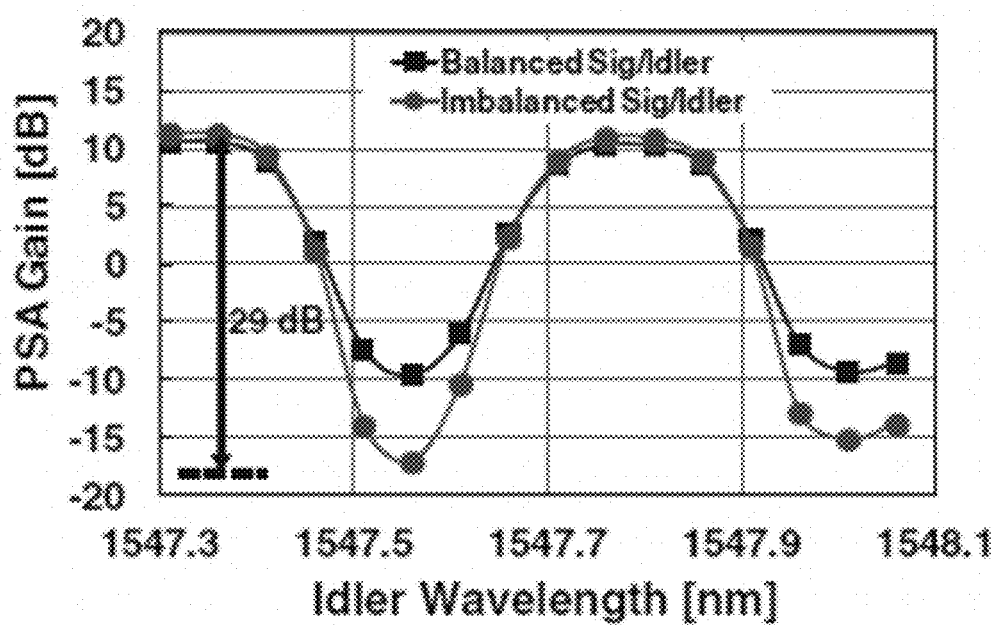
FIG. 8 illustrates an optical measured idler filter transfer function in accordance with an embodiment of the present invention.
Figure 9:
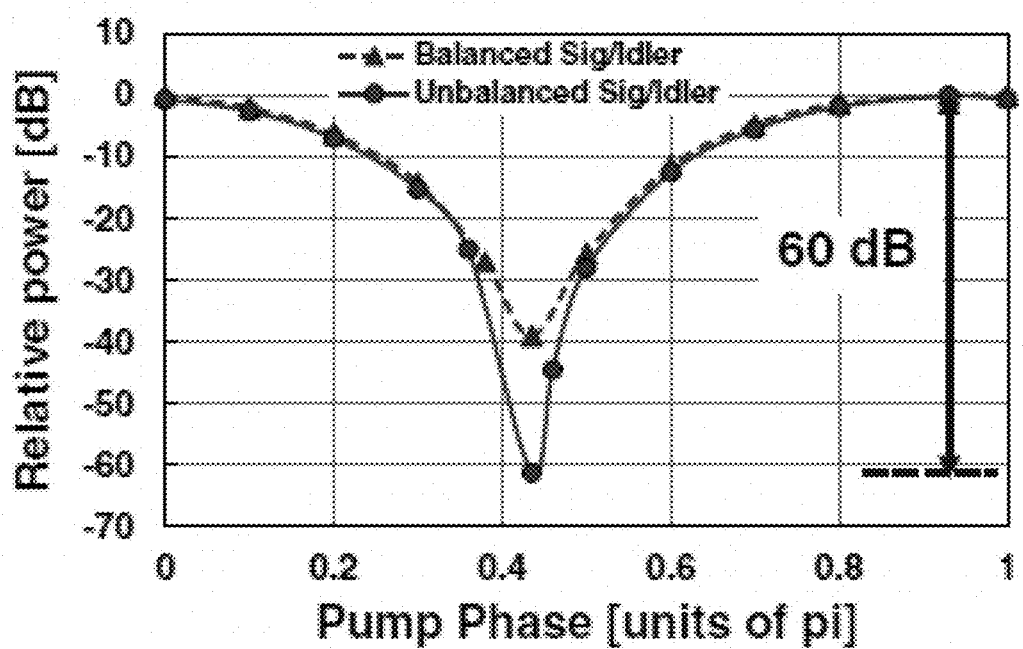
FIG. 9 illustrates a measured electrical output power versus PSA pump phase for equalized and unequalized input signal and idler in accordance with an embodiment of the present invention.

FIG. 8 illustrates an optical measured idler filter transfer function while FIG. 9 illustrates a measured electrical output power versus PSA pump phase for equalized and unequalized input signal and idler. Thus, FIG. 8 illustrates the filter transfer function for the idler band for both cases of balanced and unbalanced input powers to the PSA 650 (FIG. 6). In this example, utilizing the embodiment of FIG. 6 with the alterations in the signals discussed, for balanced inputs, the measured extinction in the optical domain is 20 dB for a PSA 650 (FIG. 6) gain of 10 dB. To unbalance the input powers, the idler is attenuated with respect to the signal wavelength in the WSS 640 (FIG. 6). In this example, the optimal imbalance is 1.5 dB, as shown in FIG. 7. With this imbalance in the input powers, the optical extinction on the idler wavelengths is enhanced to 29 dB.

Assuming a direct detection receiver, this extinction is doubled (in dB units) in the electrical domain (or equal to $G^4$) due to the square-law nature of O/E conversion. This can be illustrated when utilizing the embodiment of FIG. 6, which illustrates the phase sensitive nature of the PSA, when the signal and idler bands include 1 GHz modulation. Thus, photo detection results in a tone at 1 GHz (and harmonics) on the RFSA. When the idler band is selected for detection, and the electrical output power at 1 GHz is measured as a function of the PSA 650 pump phase. As the pump phase is varied, the PSA 650 switches between amplification and deamplification modes, displaying characteristic phase-sensitive behavior. In this example, the resulting electrical extinction is 60 dB, as shown in FIG. 9. In FIG. 9, the electrical power is normalized to a maximum output of 0 dBm.

In an embodiment of the present invention, for equalized inputs, the PSA-based amplification and deamplification are given by the same factor G, where G is the maximum phase-sensitive gain. The extinction or contrast in the optical domain is thus limited to C. By optimizing the input imbalance, the deamplification can be increased (e.g., significantly) beyond G, and the filter optical extinction is enhanced beyond $G^2$. This signifies that ultrahigh optical filter extinction is obtainable even with moderate-gain PSAs.

Figure 10:
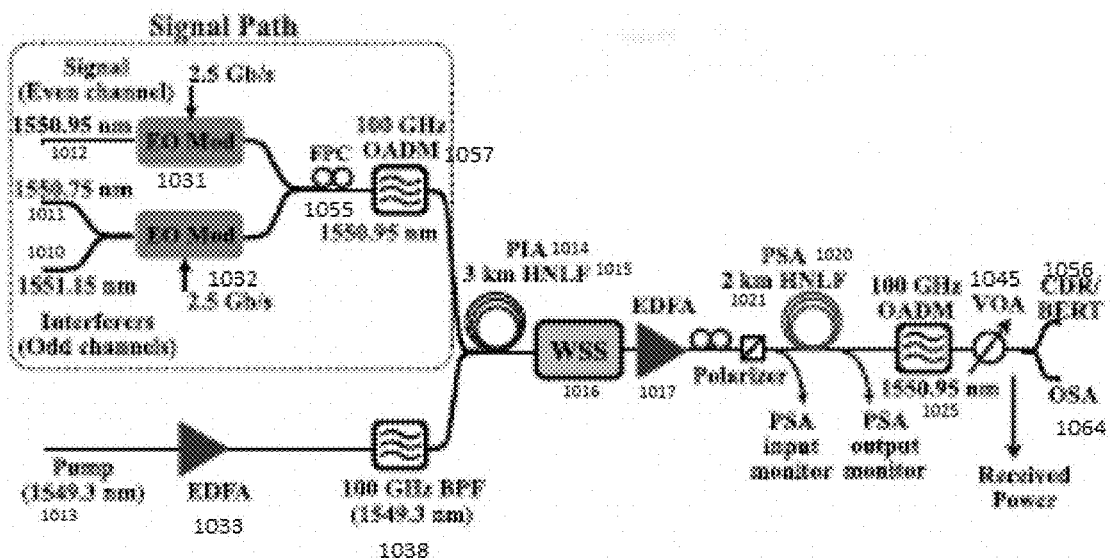
FIG. 10 illustrates certain aspects of some embodiments of the present invention.

FIG. 10 illustrates certain aspects of some embodiments of the present invention. As seen in FIG. 10, this embodiment includes two electro-optic modulators (EOs) 1031, 1032. The embodiment of FIG. 10 includes three distributed feedback (DFB) lasers 1010, 1011, 1012, one used for the signal channel 1012 and two lasers 1011, 1012 for the interfering channels, in this embodiment, spaced at ±0.2 nm from the signal wavelength. These are modulated by two electro-optic modulators (EOs) 1031, 1032. In this embodiment, the signal channels also pass through a fiber polarization controller (FPC) 1055 and an Optical Add-Drop Multiplexer (OADM) 1057.

Thus, the output of the signal laser at 1550.95 nm is on-off keying (OOK) modulated at 2.5 Gb/s using a standard $2^{23}-1$ pseudorandom bit sequence (PRBS). The two interferer wavelengths are combined and also OOK modulated in a separate modulator with 2.5 Gb/s PRBS data that is decorrelated from that of the desired signal channel. All three modulated signals are then combined.

In FIG. 10, the output of another DFB laser 1013 at 1549.3 nm is amplified to 18 dBm through an erbium doped fiber amplifier (EDFA) 1033 through a bandpass filter (BPF) 1038 and pumps the fiber-based pump-degenerate PIA and PSA. The pump is combined with the three modulated signals and input to the PIA 1014, which consists of a 3 km length of highly nonlinear fiber (HNLF) 1015 with a nonlinear coefficient of 10 $W^{-1}$ $km^{-1}$ and a zero dispersion wavelength (ZDW) of ~1580 nm. In an embodiment of the present invention, the PIA 1014 generates conjugate copies of the three modulated signals at the corresponding idler frequencies.

Figure 11:
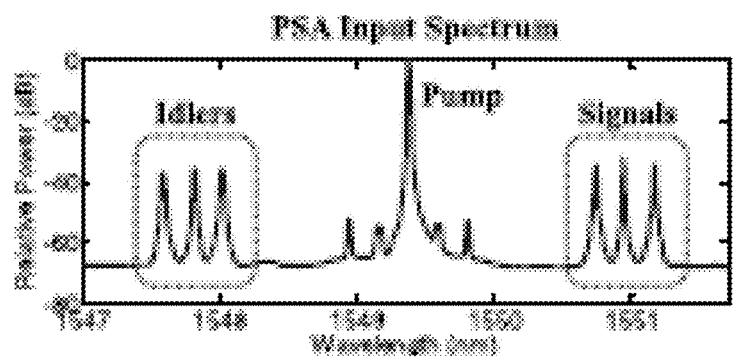
FIG. 11 illustrates pump, signal, and idler wavelengths in the PSA input spectrum in embodiments of the present invention.

As explained regarding earlier embodiments, as aspect of certain aspects of embodiments of the present invention is a signal converter, which generates the corresponding idler wavelengths as both signal and idler are required at the PSA 1020 input to enable phase sensitive behavior. In the embodiment of FIG. 10, the PIA 1014 creates the idler copies with approximately the phase required for amplification in the following PSA 1020. The pump, signal, and idler wavelengths can be seen in the PSA input spectrum shown in FIG. 11.

Returning, the FIG. 10, the output of the PIA 1014 is sent to a Finisar Waveshaper® (WSS) 1016, which enables independent adjustment of amplitude and phase for each wavelength. In this embodiment, the WSS 1016 serves two purposes: equalizing the signal and idler amplitudes at the PSA 1020 input, and imposing a spectral phase mask 1017 on the signal (not idler) wavelengths. Thus, as seen in FIG. 10, the pump phase is first adjusted to maximize the gain in the PSA 1020 and then, a spectral phase mask is applied, (e.g., where 0 and π phase shifts are applied to the desired signal, e.g., 1550.95 nm and interfering wavelengths, respectively). Properly setting the relative phases of all wavelengths ensures that the desired signal experiences amplification, while the interferers experience de-amplification in the PSA 1020.

In the embodiment of FIG. 10, the output of the WSS 1016 is boosted with an erbium-doped fiber amplifier (EDFA) 1017 followed by a polarizer to co-polarized all wavelengths for interaction in the PSA 1020. The pump, along with the signal, two interferers, and all the corresponding idlers, are then sent to the PSA 1020 which, in this non-limiting example, is a 2 km length of HNLF 1021 with a nonlinear coefficient of 11 $W^{-1}$ $km^{-1}$, a zero dispersion wavelength of 1540 nm, and a total loss of 2 dB. Thus, the pump power into the PSA is set to 17.5 dBm, while the power in each of the signals and idlers is ~−11.5 dBm. These powers result in an internal PSA gain of GPSA=10 dB. There is a contrast of 20 dB between the amplified and de-amplified modes at the PSA output. The output of the PSA 1020 is filtered by a 100 GHz optical add-drop multiplexer (OADM) 1025 centered at 1550.95 nm such that the pump and idlers are suppressed by >30 dB, while all three modulated signal wavelengths (i.e., the desired signal and two interferers) are passed through. In an embodiment of the present invention, internal coherence control can be enabled to the DFB lasers to broaden their linewidths to ~1 GHz in order to suppress stimulated Brillouin scattering in the HNLFs. The output can then be processed through a variable optical attenuator (VOA) 1045, and one of a clock-data recovery (CDR) 1056 or a bit-error rate tester (BERT) 1064.

Figure 12:
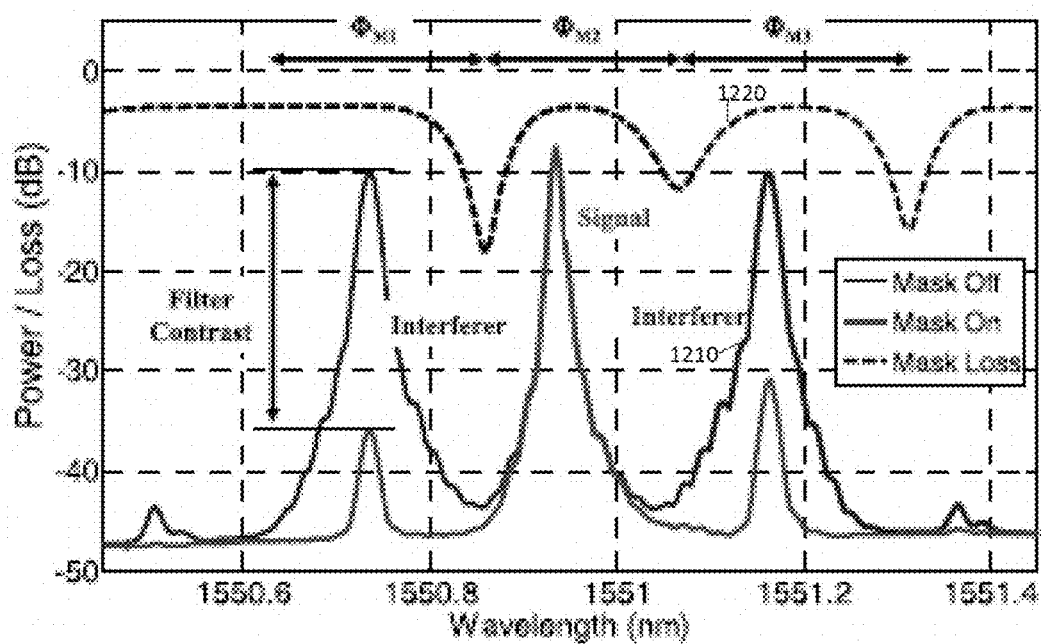
FIG. 12 illustrates certain aspects of embodiments of the present invention.

As the system of FIG. 10 operates, one can verify the operation of the photonic-based channelization enabled by the phase sensitive amplification in this embodiment. One can verify the amplification and de-amplification modes of the PSA-enhanced filter. In order to verify the amplification, using the WSS 1016, one can define three independently adjustable spectral phase bands at the three signal wavelengths to create the spectral phase mask. In embodiments of the present invention, the WSS 1016 introduces increased amplitude losses in the phase transition regions between these three spectral bands. To minimize the impact of this loss, the spectral phase mask is designed (and/or configured) such that the phase transitions occur between the signal and interferer wavelengths, where there is no optical power, as seen in FIG. 12. As illustrated in FIG. 12, amplitude changes to the signal and interferer bands at the PSA output thus result from amplification and de-amplification by the PSA 1020.

One can record the spectral outputs from the PSA-enhanced filter when the spectral phase mask is enabled and disabled in the WSS, as shown in FIG. 12. The interferer trace 1210 shows the output powers for the desired signal as well as the two interferers when the phase mask is disabled. The relative loss profile 1220 of the phase mask is also shown in FIG. 12. As noted previously, the loss modulation is designed to occur in the spectral region between the signal and interferer wavelengths. In FIG. 12, the three adjustable spectral phase regions in the spectral phase mask are labeled as M1, M2, and M3. The interferer trace 1210 shows the output powers when the phase mask is enabled, and where M2~0, and M1~M3~$\pi$. Consistent with the 10 dB internal gain of the PSA, the interfering wavelengths are notched by at least 20 dB while the desired signal is passed.

Figure 13:
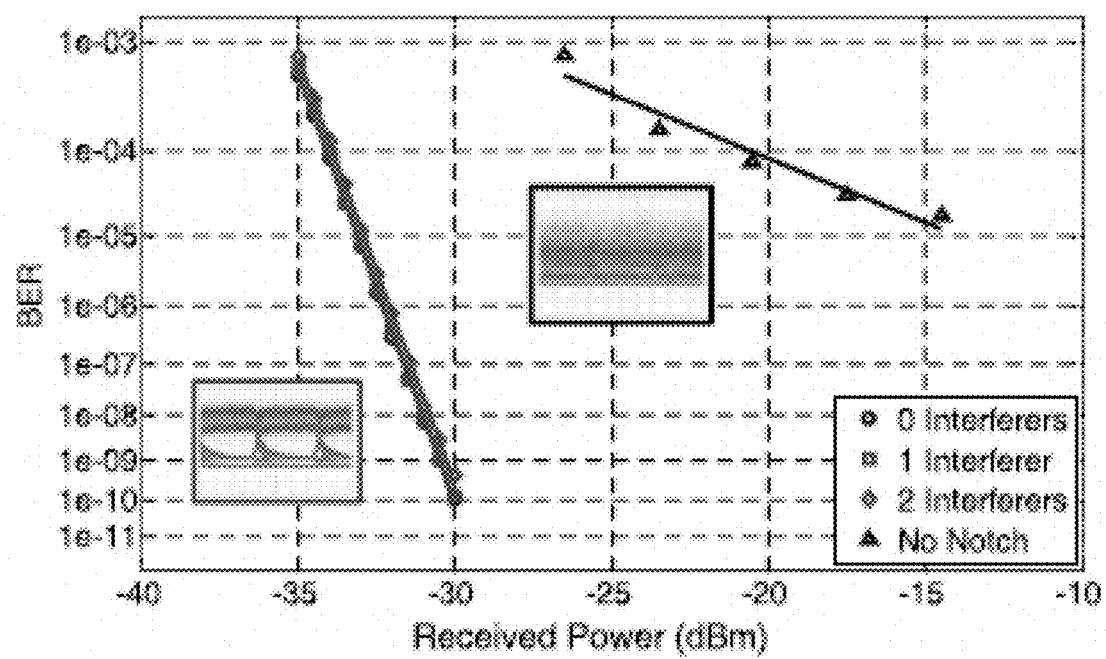
FIG. 13 illustrates certain aspects of embodiments of the present invention.

The system performance for the PSA-enhanced filter in embodiments of the present invention is evaluated through bit error rate (BER) measurements. The output of the OADM is detected by an OC-48 receiver and the BER is measured as a function of received power. The BER results are summarized in FIG. 13. The system performance with no interferers (i.e., circles) demonstrates a receiver sensitivity at BER=10-9 of ~−30.5 dBm. When the two interferers are turned on, the performance significantly degrades and an error floor appears around BER=10-5. Thus, applying the spectral phase mask enables the 20-dB notch filter at the interferer wavelengths and the system penalty becomes insignificant.

Figure 14:
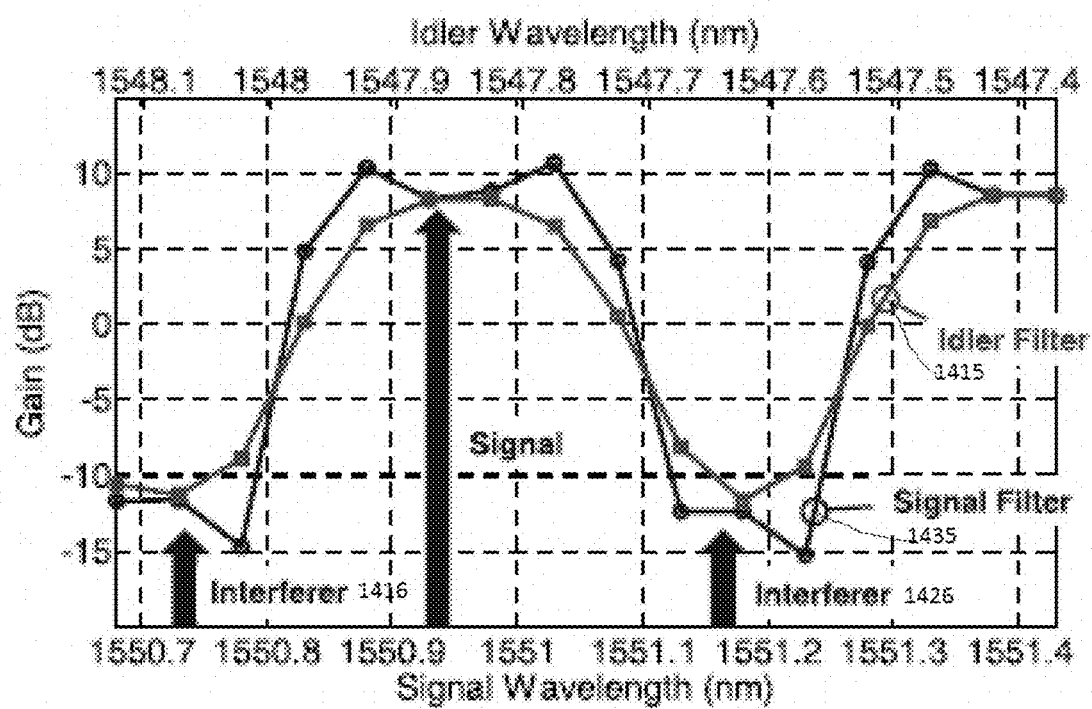
FIG. 14 illustrates certain aspects of embodiments of the present invention.

The configuration of the embodiments of the present invention in FIG. 10 can be modified to assess the optical transfer function obtained for the PSA-enabled photonic filter. Another embodiment of the present invention replaces the signal path with a single external cavity laser (ECL) that is swept in wavelength from approximately 1550.7 to approximately 1551.4 nm and the PSA input and output powers are recorded at the signal and idler wavelengths on an optical spectrum analyzer. Though the phase mask modified only the signal spectral phases while the idler spectral phases are unmodified, both the signal and idler wavelengths are impacted by the phase-sensitive gain in the PSA. In this embodiment, one can measure the transfer function of the PSA on both the signal and idler side of the pump. An example of the results of this measurement is shown in FIG. 14. Here the idler trace 1415 shows the filter shape for the idler, and the pass and reject bands have net gains corresponding to $G_{PSA}T_{fiber}$ and $T_{fiber}/G_{PSA}$, respectively. The result is the anticipated $G^2$ PSA filter contrast, and the two notch regions correspond to the two interferer wavelengths. FIG. 14 also shows the signal filter shape 1435. As seen in FIG. 14, there are some ripples near the band edges corresponding to the amplitude modulation in the phase transition regions in the phase mask noted above. The ripples suggest further extinction ratio enhancements are possible by optimizing the signal and idler relative powers. Thus, FIG. 14 displays a PSA transfer function indicating the filter profile for signal 1435 and idler 1415. The arrows indicate the spectral locations of the signal and two interferers 1416, 1426.

In an embodiment of the present invention, the electrical power response of the filter can be measured by dual-sideband modulating the signal laser at 1 GHz using a continuous wave RF tone, and measuring the output of the 100 GHz OADM on an RF spectrum analyzer (RFSA). The relative power of the 1 GHz tone is measured as a function of optical pump relative phase into the PSA, and not only provides a measure of the corresponding electrical extinction obtained in the PSA-enhanced filter but also demonstrates the characteristic phase-sensitive behavior of the PSA.

Figure 15:
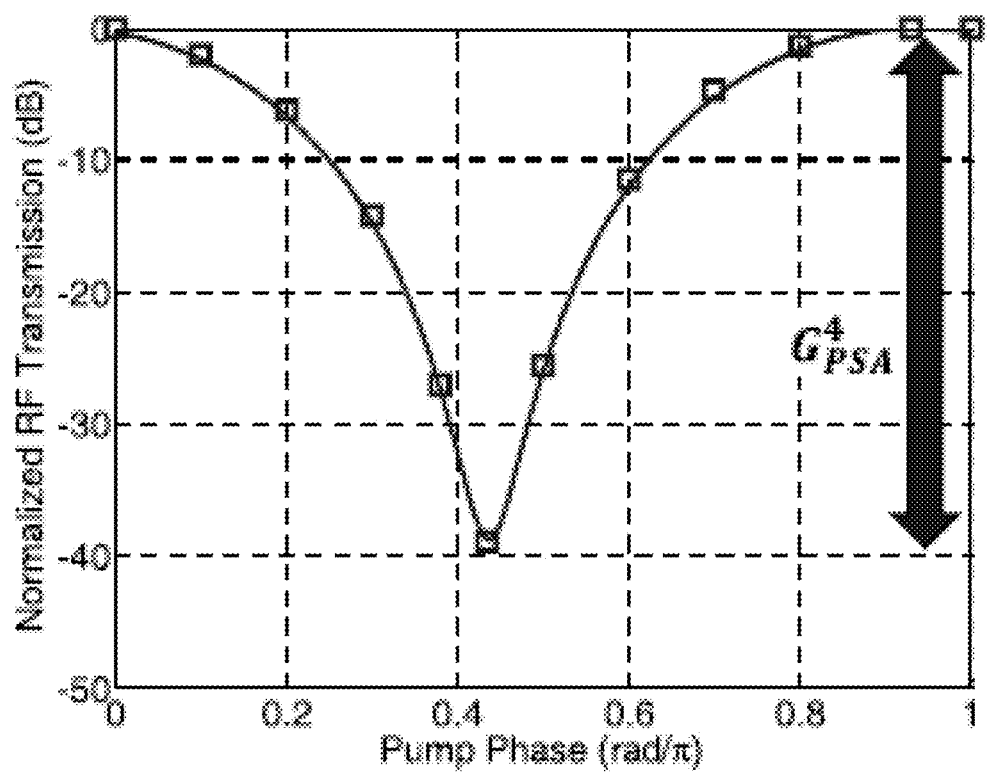
FIG. 15 illustrates certain aspects of embodiments of the present invention.

The normalized transmission results are shown in FIG. 15, the electrical response of the PSA filter, showing the $G^4$ PSA notch depth. $G_{PSA}$ is the maximum internal optical power gain of the PSA. As seen in this figure, the notch depth in this plot is 40 dB, which verifies the expected $G^4_{PSA}$ extinction in the RF domain due to square-law direct detection. Thus, in embodiments of the preset invention, a 20 (40) dB notch active filter can be used in the optical (electrical) domain using the amplification and de-amplification properties of a PSA, with the extinction scaling quadratically (biquadratically) with internal PSA gain. Additionally, in embodiments of the present invention, the filter center frequency and bandwidth can be reconfigured by setting the spectral phase mask. Although certain examples were utilized herein, significantly higher filter extinctions are possible with larger PSA gains, and the wideband signal transparency of this technique makes it beneficial for analog as well as digital system filtering. The filter resolution, or selectivity, depends on the implementation of the spectral phase mask and can be limited by and WSS, which was designed for operation across the C-band. Embodiments of the present invention utilize optical PSAs in signal processing to enable reconfigurable, frequency tunable, and high extinction optical filters for digital and analog applications. Furthermore, ongoing advances in photonic integration technology can be leveraged to enable high gain PSAs in small packages.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

We claim:

1. A method for channelization of a wideband radio frequency signal into multiple narrowband channels, comprising:
   obtaining, a dual-banded optical signal, wherein the dual-banded signal is a translated wideband radio frequency signal, and wherein the dual-banded signal comprises a signal and an idler;
   modifying, by the spectral phase mask, the spectral phases of at least one of the signal or the idler, wherein the modifying produces a spectral phase modulated output comprising at least one of a spectrally-modulated signal or a spectrally modulated idler;
   outputting, by the spectral phase mask, the spectral phase modulated output to an optical phase sensitive amplifier;
   receiving, by the optical phase sensitive amplifier, the spectral phase modulated output;
   either amplifying or de-amplifying, by the optical phase sensitive amplifier, each component of the spectrally modulated output, the amplifying or the deamplifying of each component based on a spectral phase modulation of each component relative to the phase of the optical phase sensitive amplifier pump, wherein the either amplifying or deamplifying produces a filtered signal and a filtered idler band;
   outputting, by the optical phase sensitive amplifier, the at least one of the filtered signal or the filtered idler band to an optical filter;
   receiving, by the optical filter, the at least one of the filtered signal or the filtered idler band;
   spatially separating, by the optical filter, the at least one of the filtered signal or the filtered idler band into channels; and
   down-converting the channels to narrowband intermediate frequency channels by combining each channel of the channels with a filtered local oscillator.

2. The method of claim 1, wherein the filtered local oscillator for combining with each channel is generated by separating a local oscillator generated by a frequency comb into a group of individual oscillators utilizing a frequency comb filter, wherein the group of individual oscillators comprises the filtered local oscillator.

3. The method of claim 1, wherein the down-converting comprises utilizing the filtered local oscillator to recover radio frequency phase and amplitude from a channel of the channels.

4. The method of claim 2, wherein the local oscillator is generated using one of: a mode-locked laser, an optical comb generator or a sinusoidally-driven phase modulator cascade.

5. The method of claim 2, wherein wideband radio frequency signal and the local oscillator are generated utilizing a single radiation source.

6. The method of claim 1, wherein the obtaining the dual-banded optical signal is from a signal converter, wherein the signal converter translated the wideband radio frequency signal into the dual-banded optical signal.

7. The method of claim 6, wherein the signal converter comprises one of: an optical modulator or a parametric phase-insensitive amplifier.

8. The method of claim 1, further comprising:
   enhancing extinction by unbalancing powers of the signal and the idler to the phase sensitive amplifier.

9. The method of claim 1, wherein the obtaining the dual-banded optical signal is by optical-to-electrical frequency conversion.

10. A system for channelization of a wideband radio frequency signal into multiple narrowband channels, comprising:
    a spectral phase mask, configured to obtain a dual-banded optical signal from a signal converter, wherein the dual-banded optical signal is a translated wideband radio frequency signal, and wherein the dual-banded optical signal comprises a signal and an idler, to modify the spectral phases of at least one of the signal or the idler, wherein the modifying produces a spectrally modulated output comprising at least one of a spectrally-modulated signal or a spectrally modulated idler, and to output the spectrally modulated output to an optical phase sensitive amplifier;
    the optical phase sensitive amplifier, configured to receive the spectrally modulated output from the spectral phase mask, and to either amplify or de-amplifying each component of the spectrally modulated output, the amplifying or the deamplifying of each component based on a spectral phase modulation of each component relative to the phase of the optical phase sensitive amplifier pump, wherein the either amplifying or deamplifying produces a filtered signal and a filtered idler band; and
    an optical filter, wherein the optical phase sensitive amplifier is further configured to output the at least one of the filtered signal or the filtered idler band to the optical filter, and the optical filter is configured to receive the at least one of the filtered signal or the filtered idler band to an optical filter and to separate the at least one of the filtered signal or the filtered idler band into channels.

11. The system of claim 10, further comprising:
    a down-converter configured to down-convert the channels to narrowband intermediate frequency channels by combining each channel of the channels with a local oscillator.

12. The system of claim 11, further comprising:
    a frequency comb configured to generate a local oscillator; and
    a frequency comb filter configured to receive the local oscillator from the frequency comb and separate the local oscillator into a group of individual oscillators comprising the filtered local oscillator.

13. The system of claim 12, further comprising one of:
    a mode-locked laser configured to generate the local oscillator; or
    an optical comb generator configured to generate the local oscillator.

14. The system of claim 12, further comprising:
    a radiation source configured to generate the wideband radio frequency and the local oscillator.

15. The system of claim 10, further comprising:
the signal converter configured to obtain the wideband radio frequency signal and convert the wideband radio frequency signal into the dual-banded optical signal.

16. The system of claim 15, wherein the signal converter comprises one of: an optical modulator or a parametric phase-insensitive amplifier.

17. The system of claim 13, wherein the optical comb generator is a sinusoidally-driven phase modulator cascade.

18. The system of claim 13, further comprising:
an optical processor to implement the spectral phase mask, wherein the optical processor unbalances powers of the signal and the idler by attenuating the idler with respect to the signal.

* * * * *